United States Patent [19]

Palombella

[11] 3,796,988

[45] Mar. 12, 1974

[54] WIRE RETENTION TERMINAL AND TRANSISTOR SOCKET

[75] Inventor: Dominick P. Palombella, Norridge, Ill.

[73] Assignee: Palmer Industries, Ltd., Chicago, Ill.

[22] Filed: Jan. 19, 1972

[21] Appl. No.: 219,059

[52] U.S. Cl. .......... 339/258 R, 339/275 B
[51] Int. Cl. .......... H01r 9/06
[58] Field of Search .......... 339/258, 275

[56] References Cited

UNITED STATES PATENTS

| | | | |
|---|---|---|---|
| 3,479,634 | 11/1969 | Pritulsky | 339/275 B |
| 3,543,220 | 11/1970 | Jones | 339/258 P |
| 3,156,517 | 11/1964 | Maximoff et al. | 339/275 B |
| 3,510,831 | 5/1970 | DeVito | 339/258 R |

*Primary Examiner*—Joseph H. McGlynn

[57] ABSTRACT

A wire retention terminal for receiving and securing a plurality of electrical leads for use in electronic and electrical assemblies whereby the leads are secured by the insertion thereof into the body of the terminal. The terminal includes a plurality of internally positioned and oppositely disposed fingers which are adapted to lodge a plurality of leads thereto in an effective manner. The terminal may be directly attached to a well known circuit board of any suitable type or may be coupled to a socket such as herein disclosed. The transistor socket of the invention effectively mounts a transistor wherein the sockets, terminal lugs and electrical leads may be all connected and mounted to a board or panel from one side.

9 Claims, 15 Drawing Figures

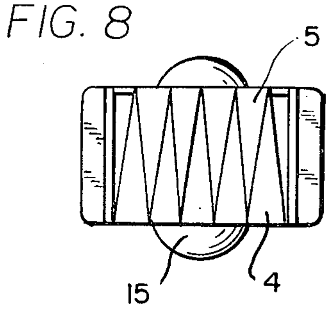
FIG. 8
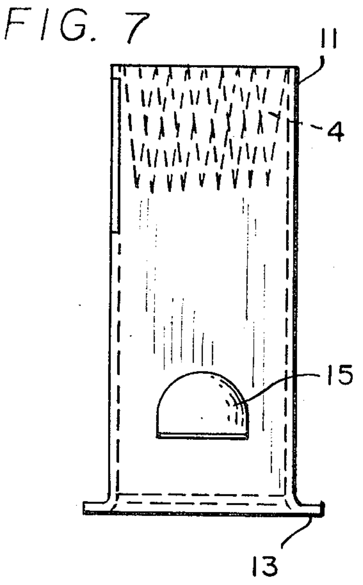
FIG. 7
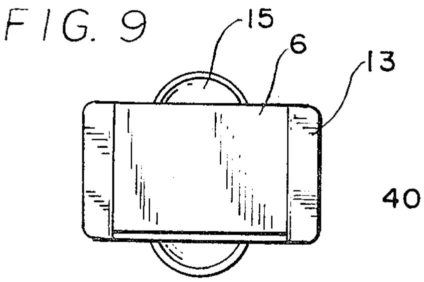
FIG. 9
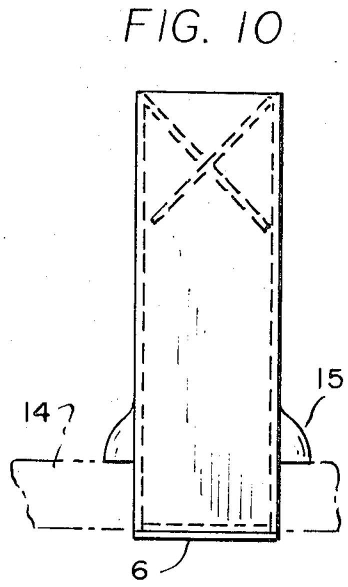
FIG. 10
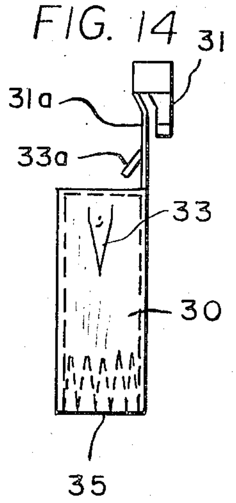
FIG. 14
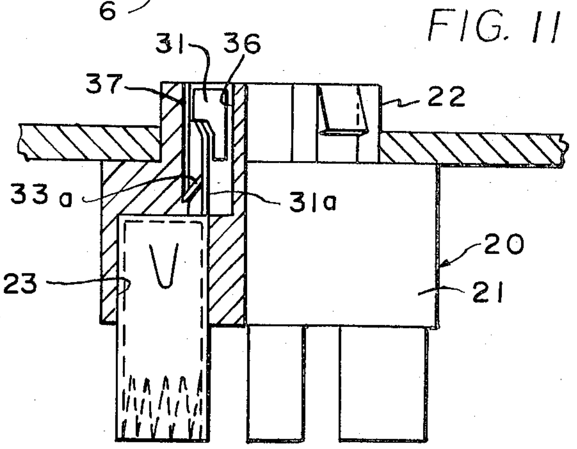
FIG. 11
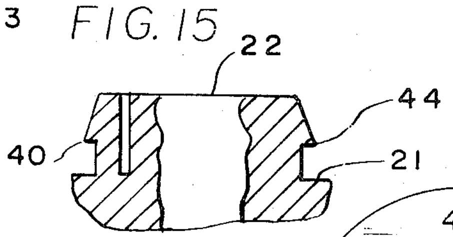
FIG. 15
FIG. 12
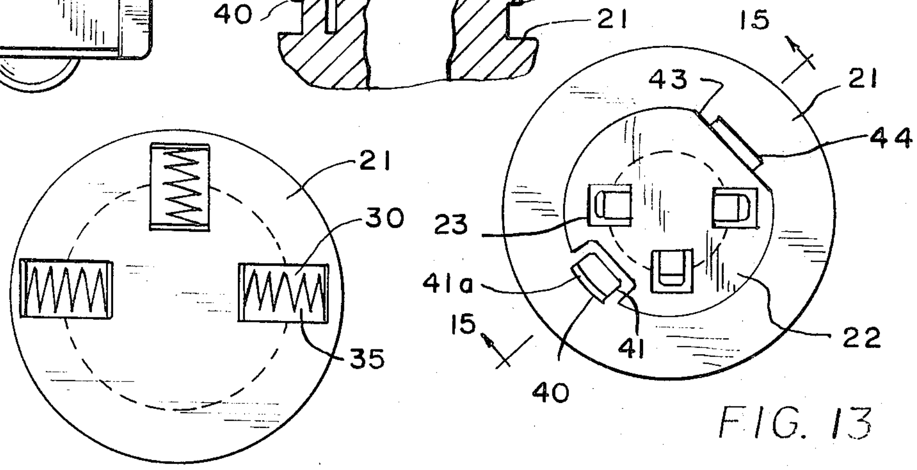
FIG. 13

PATENTED MAR 12 1974 3,796,988

SHEET 1 OF 2

WIRE RETENTION TERMINAL AND TRANSISTOR SOCKET

BACKGROUND OF THE INVENTION

This invention relates in general to electrical circuits and in particular to improved electrical lead retainers and transistors sockets.

More specifically, the invention relates to a wire retention terminal which readily receives and secures a plurality of electrical leads wherein said terminal includes an opening for receiving said leads and further includes internally positioned finger-like elements which cooperate to lodge a plurality of electrical leads therebetween for securement to the device. The electrical terminal is provided with a solder inlet which permits solder and the like to be introduced internally of the terminal to attach the electrical leads in a permanent connection. The terminal lug of the invention may be utilized in conjunction with any conventional circuit board, panel or similar structure wherein the mounted lugs may be electrically insulated, selectively interconnected, or mounted in any other conventional manner. In addition, the terminals may be utilized with an improved transistor socket of the invention which permits the electrical leads, terminals, transistors and sockets to be interconnected and mounted to a circuit board from the same side thereof.

In electronic or electrical assemblies, particularly those utilizing various baseboard designs, it is desirable that electrical leads are quickly attached and connected in the circuits such as during the manufacturing process. The prior art method of soldering each lead to a particular terminal has proven to be a tedious and time consuming technique which is not economically adaptable to modern high volume applications. In order to overcome the deficiencies of the aforementioned handwiring procedures, it has been attempted in the prior art to utilize terminals which receive leads in a manner that the wires are resiliently secured to a terminal and solder is later introduced to make the connection permanent. The known wire retention terminals possess several disadvantages such as a limitation to the number of wires which could be effectively received by the device. As the number of leads secured to the prior art terminals is increased, the efficiency of retention of the wires is drastically reduced. In addition, the particular technique employed by the previous insertion type terminals did not achieve a sufficient degree of securement of the leads even when a limited number of leads were being attached.

There are also problems presented by the designs of known transistor sockets for supporting a transistor means in an electronic assembly. The transistor sockets with which the prior art wire retention terminals are utilized are not designed to internally receive a terminal and an electrical lead in a manner to permit an assembler to interconnect the socket, terminal and electrical leads and attach the elements to a conventional circuit board from the same side. In the prior art, it is general practice that the socket must be inserted on a board or other support surface from one side and the terminal wires and leads attached to the sockets from the other side. Such a technique of assembling the transistor assembly has proven to be deficient since it does not permit the rapid assembling of the elements and thus requires additional uneconomical assembling time.

SUMMARY OF THE INVENTION

It is, therefore, an object in this invention to improve the retention of leads to a terminal.

Another object of this invention is to improve the ease at which a plurality of leads are secured to a terminal.

It is a further object of this invention to maintain a plurality of wires by resiliently lodging them between intersecting elements.

Still another object of this invention is to reduce the cost and difficulty in manufacturing a wire retention device.

A still further object of this invention is to provide an improved electrical transistor socket.

Another object of this invention is to improve the technique of assembling an electrical transistor circuit.

A further object of this invention is to reduce the time and effort needed to mount a transistor to a support structure.

These and other objects are attained in accordance with the present invention wherein there is provided a novel wire retention terminal and transistor socket. The wire retention terminal herein disclosed includes a wire receiving opening which receives electrical leads for retention therein. The terminal of the invention is capable of securely receiving a plurality of wires wherein the terminal includes two banks of a plurality of interiorly positioned finger means which are disposed from opposite sides of the receptacle. One bank of finger elements possesses one more finger element than the opposite bank. The design of the finger elements herein disclosed not only resiliently secures the wires within the terminal, but further a finger of one bank of the terminal causes an inserted lead to wedge or be in frictional contact between two adjacent fingers on the opposite bank of the terminal. This improved securement technique of the electrical leads significantly increases both the number of leads which can be accommodated by a respective terminal and the efficiency of securement of the wires.

The terminal of the invention further includes novel solder inlet means whereby after leads are secured to the terminal, the body may be conveniently dipped into a solder and the wires permanently affixed.

The novel wire retention terminals disclosed herein may be utilized with an improved transistor socket of the invention wherein there is provided a socket which inexpensively and effectively supports a transistor on a circuit board or panel. The socket of the invention permits the transistor socket, terminals and the electrical leads to be assembled together and into a desired position on the board in an improved manner. Since the socket herein disclosed includes means to affix a socket to a circuit board from the bottom thereof, the transistor socket, terminal, the electrical leads and the like may be assembled or connected together and the assembly then be mounted to a board without the necessity of flipping or turning the board as required by the prior art. Such an improved result significantly reduces the time required in assembling an electrical circuit.

BRIEF DESCRIPTION OF THE DRAWINGS

Further objects of the invention, together with additional features contributing thereto and advantages accruing therefrom, will be apparent from the following description of several embodiments of the invention when read in conjunction with the accompanying drawings, wherein:

FIG. 7 is a schematic front illustration of still another embodiment of the wire retention terminal of the invention.

FIG. 8 is a top schematic illustration of the wire retention terminal of FIG. 7.

FIG. 9 is a bottom schematic illustration of the wire retention terminal of FIG. 7.

FIG. 10 is a schematic side illustration of the wire retention terminal of FIG. 7.

FIG. 11 is a partial sectional side schematic illustration of a transistor socket of the invention utilizing an embodiment wire retention terminal of the invention.

FIG. 12 is a bottom schematic illustration of the transistor socket of FIG. 11.

FIG. 13 is a top schematic illustration of the transistor socket of FIG. 11.

FIG. 14 is a schematic side illustration of a wire retention terminal of the invention having a transistor holder attached thereto as in the transistor socket of FIG. 11.

FIG. 15 is a section illustration of transistor socket taken along line 15—15 of FIG. 11.

DESCRIPTION OF THE PREFERRED EMBODIMENTS

Referring now to FIGS. 1–6 there is illustrated an embodiment of the wire retention terminal of the invention. Wire retention terminal 1 includes elongated body 2 formed from any suitable material such as a metal and the like and which possesses, when assembled, a rectangular configuration in a plane transverse to the longitudinal axis of the body.

Figure 1:
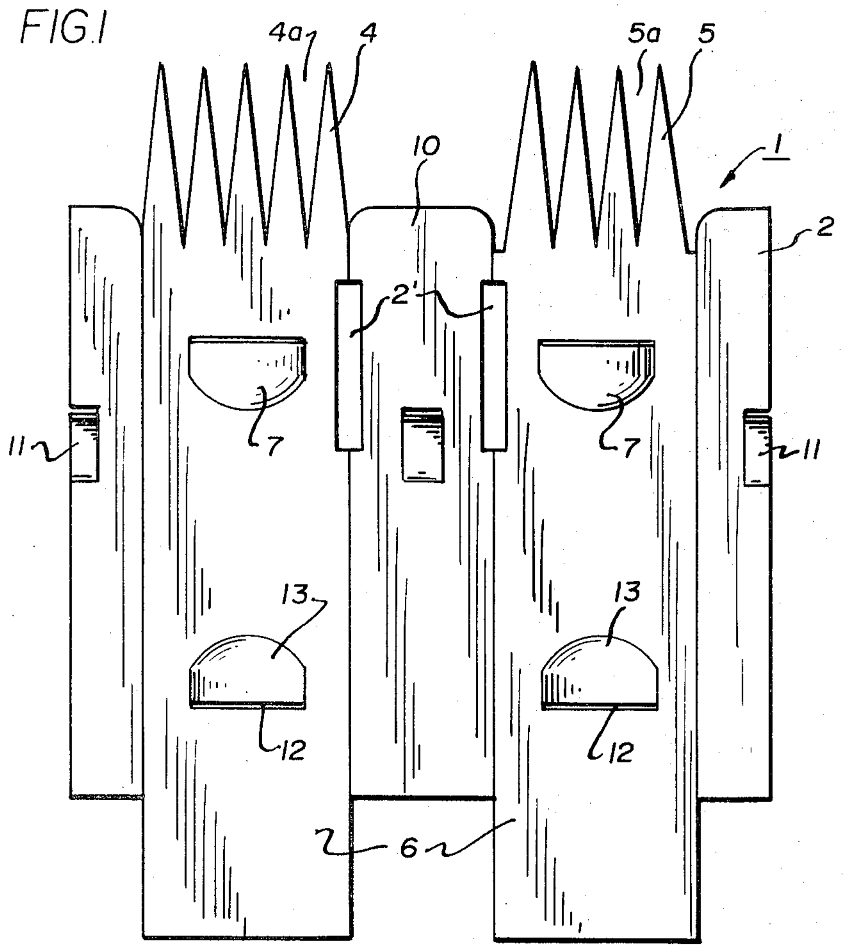
FIG. 1 is a front schematic view of the blank from which an embodiment of wire retention terminal of the invention is formed.
Figure 2:
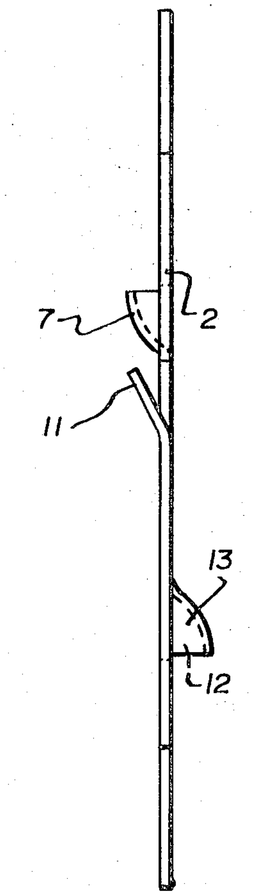
FIG. 2 is a side schematic view of the blank of FIG. 1.
Figure 3:
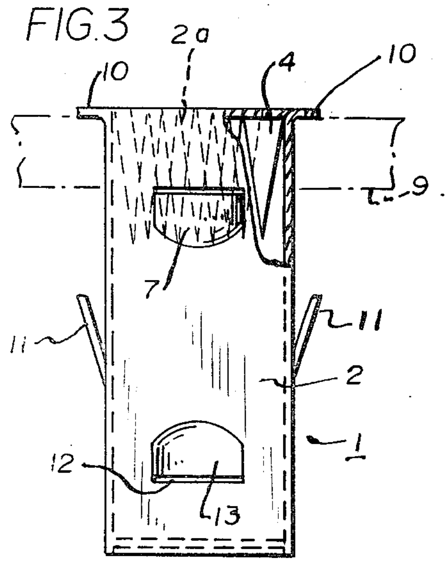
FIG. 3 is a front schematic illustration with sections broken away of an embodiment of the wire retention terminal of the invention.
Figure 4:
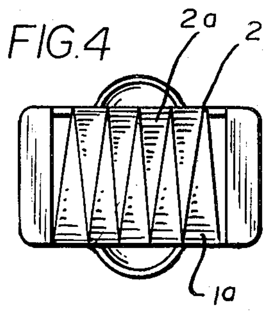
FIG. 4 is a top schematic illustration of the wire retention terminal of FIG. 3.

Viewing FIGS. 1 and 2, there is illustrated a blank of the wire receiving terminal 1 from which the terminal is conveniently manufactured. As can be seen in FIGS. 1 and 2, the terminal blank is readily stamped out or otherwise manufactured and may be folded to form the embodiment of terminal illustrated in FIGS. 3 to 6. Other embodiments of the wire retention terminal may also be manufactured from a blank similar to the one illustrated in FIGS. 1 and 2. Alternatively, the terminal may be manufactured by other suitable techniques, if desired.

The embodiment of the wire retention terminal illustrated in FIGS. 1–6 is adapted to be attached to a conventional terminal board, panel, or other support member of any suitable design wherein the upper end of the receptacle receives one or more electrical leads 3 for securement in body 2. Elongated openings 2′ are provided adjacent the upper end of the terminal to insure that a rectangular configuration is achieved during the folding operation of the terminal.

Referring in particular to FIGS. 1, 3, 4 and 6, wire retention terminal 1 includes two banks of a plurality of flat tapered fingers elements 4 and 5 which include a tapered or triangular configuration for reasons to be explained in detail later. During assembling of the terminal shown in FIGS. 3, 4 and 6, the fingers are bent inward of the body 2 at a desired angle whereby fingers 4 and 5 intersect each other within the terminal. Since fingers 4 and 5 are bent inward and downward into body 2, the fingers possess a degree of resilience to aid in retaining a plurality of wires in the terminal body. The electrical leads 3 to be secured to the terminal are inserted into opening **2*a* formed at the top of the body for engagement with the finger element 4 and 5.**

Fingers 4 and 5 extend from respective opposite sides of the terminal when assembled and one more finger 4 is provided than the number of fingers 5. Although five fingers is illustrated as the number of elements of fingers 4 and four is the number of the fingers 5, it should be apparent to one skilled in the art that any number of fingers may be utilized in conjunction with the invention as long as one side of the terminal possesses an additional finger than the other side.

Figure 5:
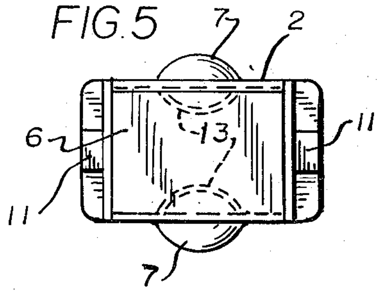
FIG. 5 is a bottom schematic illustration of the wire retention terminal of FIG. 3.
Figure 6:
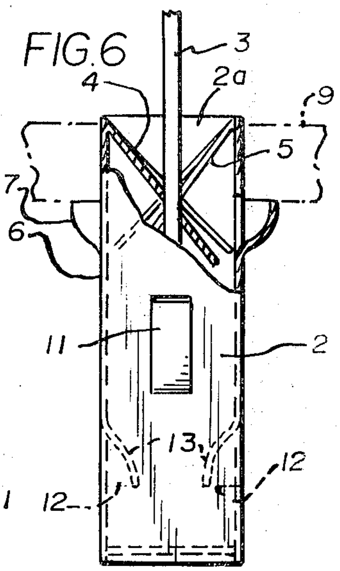
FIG. 6 is a side schematic illustration with sections broken away of the wire retention terminal of FIG. 3.

Bottom tabs 6 shown in FIG. 1 are folded and overlapping by a conventional technique to form a closed bottom as shown in FIG. 5 to permit the body to retain solder and to insure that the leads inserted into the terminal do not extend through the body. A pair of flaps or lugs 7 are cut out on opposite sides of body 2 for the purpose of contacting the bottom of a surface of a circuit board or panel 9 as best shown in FIG. 6. The top of body 2 further includes a pair of bendable stake elements 10 which are bent to secure the terminal to the circuit board between stake 10 and lug 7. In addition, a pair of cut out retaining elements 11 are formed on body 2 to retain the terminal to a panel, hole, and the like (not shown) if desired.

The embodiment of FIGS. 3 to 6 further includes a pair of solder inlet openings 12 which are formed by inwardly directed tags 13. The solder inlet openings permit the terminal to be inserted into a bath of solder and the like whereby the solder is introduced into the body of terminal 10 and the electrical leads inserted are permanently and electrically connected to the terminal. The design of the solder inlet 16 affords protection against the leads being inserted into the body 2 and passing out through the solder openings during attachment of the wires since the inwardly disposed tabs 13 act as guards for any of the electrical leads inserted into body 2.

The novel design of wire terminal permit a plurality of electrical leads to be inserted into the body through opening 6 for permanent retention which may include the later application of solder to the interior of the terminal. The fingers elements 4 and 5 operate to deflect downward upon the insertion of leads through opening 2a at the upper end of the terminal body. Since the fingers elements 4 and 5 respectively intersect each other between two adjacent fingers of the opposite fingers, it should be apparent the introduction of a wire through the intersecting fingers causes the fingers to resiliently contact the leads. The retention of the wire between the fingers is accomplished by one of either fingers 4 or 5 biasing a lead into a wedged position between a pair of the oppositely disposed finger elements in one of the respective tapered spaces 4a or 5a.

The lead then assumes a wedged position in either of spaces 4a or 5a and is maintained in place by an oppositely disposed finger. Thus, the finger elements both resiliently and frictionally support leads in respective spaces 4a or 5a. The terminal of the invention effectively can receive and retain a plurality of electrical leads in an improved manner. The number of leads accommodated by the novel terminal may be selected by utilizing a lesser or greater number of fingers 4 and 5 with one bank having one finger more than the other.

Referring now to FIGS. 7 to 10, there is illustrated still another embodiment of the wire retention terminal of the invention. The wire retention terminal of FIGS. 7 to 10 is similar to the embodiment illustrated with reference to FIGS. 1 to 6 and the terminal may be constructed from a design of a blank similar to that disclosed in FIG. 1.

In addition, the wire retention fingers 4 and 5 are identical to those disclosed with reference to FIGS. 1 to 6 and the terminal possesses a closed bottom 7a and top opening 2a. The wire retention terminal 10 illustrated in FIGS. 7 to 10 is adapted to be attached to a conventional circuit board or panel at its bottom end adjacent the bottom 6. To accomplish such an attachment to a circuit board, the bottom end of the body 12 of the terminal is formed with a pair of oppositely disposed stakes 13 which are adapted to be bent outward in contact with a convention board 14 and the like. The terminal includes bent out lugs 15 which contact the opposite surface of the board 14 and thus stakes 13 and lugs 15 retain the terminal to a panel or board.

Referring now to FIGS. 11 to 15, there is illustrated an embodiment of the transistors socket of the invention. The transistor socket 20 includes a body constructed of a suitable material such as nylon and the like and has a cylindrically shaped base portion 21. A board mounting portion or projection 22 having a smaller diameter than base portion 21 is unitarily connected thereto and is adapted to be snapped in position on a circuit board or other desired mounting. The base portion 21 includes one or more wire retention terminals openings 23 which are adapted to receive a respective wire retention terminal for connection to a transistor 24.

As shown in FIG. 14, a transistor socket may be utilized in conjunction with the wire retention terminal 30 having a transistor holder 31 attached thereto by an elongated stem 31a. The construction of the wire retention terminal 30 is similar to the design described with reference to the preceding embodiments although it is within the scope of the invention to utilize other wire retention terminals in conjunction with the transistor socket of the invention, if desired. Wire retention terminal 30 includes cut-out shear forms 33 which are adapted to contact the sidewalls of opening 23 in the socket in a manner to secure the wire retention terminal into the transistor socket. A shear form 33a is also formed on a side of stem 31a to aid in the retention of the terminal to the socket. Thus, end 35 having the wire retention fingers described with reference to the preceding embodiments is positioned at the bottom of the transistor socket whereby electrical leads may be inserted therein.

The upper portion of the transistor holder 31 extends upward through a passage 36 and through the upper portion 22 of the transistor housing. The passage 36 possesses a wall having a stepped configuration 37 which allows shear form 33a to interengage the step to retain the terminal. The transistor holder is adapted to support a conventional transistor or transistors in a manner that a circuit is created between the electrical leads inserted into the wire retention and the transistor.

To aid in the effective assembling of the transistor socket, wire retention terminal and transistor leads together and the mounting of the assembly to a board, the upper portion of the transistor socket includes an improved means for attaching the socket to a circuit board or other desired support element. Referring to FIGS. 13 and 15, there is illustrated the means for attaching the socket of the invention to a chassis. Mounting portion 22 of the transistor socket is provided with a partial tapered edge 40 and a U-shaped slot 41 which surrounds the tapered portion to provide an isolated area 41a having a degree of resiliency. The depth of the slot may extend the entire height of the raised portion 22 of the transistor socket if desired. Isolated area 41a is formed with an outer slot 42a beneath tapered portion 22 and which is selected to have a width substantially equal to the thickness of the circuit board chassis to which the socket is attached. The tapered portion 42 protrudes beyond the diameter of the outer periphery of projection 22.

In addition, diametrically opposite to the position of the isolated area 41a, a cut-out or flattened portion 43 of projection 22 is formed on the periphery thereof and includes a substantial tapered portion 44 which provides an exteriorly positioned slot 46 having a height also equal to the thickness of a chassis hole. It should be apparent that slots 42a and 46 are positioned on a common plane passing through the socket. The flattened portion 43 permits the socket to be inserted into a chassis hole of a board or panel which has a substantially circular hole having a complementary partial flat portion 43a.

To mount the disclosed transistor socket to a chassis, the tapered portion 44 forming slot 46 is angularly placed into the chassis hole in contact with the flat portion 43a of the hole. After slot 46 inter-engages the chassis board, the transistor socket may be raised and snapped into position whereby the isolated area 41a resiliently yields permitting the socket to snap into position on the board to allow a portion of the edge of the hole to interengage into slot 42a. The mounting means of the transistor socket permits the transistor socket to be mounted from beneath the board after the assembling of a wire retention terminal into the socket and coupling of the electrical leads and transistor to the terminal. Thus, it should be apparent that the necessity of flipping the circuit board of the chassis during assembly of the transistor circuit is alleviated by the improved socket of the invention.

Although the invention has been described with reference to preferred embodiments, it will be understood by those skilled in the art that various changes may be made and that the equivalents may be substituted for the elements thereof without departing from the true spirit of the scope of the invention. In addition, many modifications may be made to adapt a particular situation or material to the teaching of the invention without departing from its essential teachings.

What is claimed is:

1. A wire retention terminal for receiving and securing a plurality of electrical leads comprising body means including a continuous substantially closed surface forming an electrical lead receptable and an open end to create a lead receiving opening, said body means further including lead retention means extending from the open end to within the body means and adapted to retain a plurality of electrical leads therein, said lead retention means having a plurality of intersecting deflectable elements integrally attached to the body means at the open end and physically bent to extend from the open end to within the body means for resiliently wedging a plurality of electrical leads between and in contact with respective pairs of the elements for retention of the electrical leads within the receptacle, said plurality of elements includes a first group of elements positioned within said receptacle and a second group of elements positioned within receptacle in intersecting relation to said first group, and said elements being spaced from each other by a distance permitting an electrical lead inserted therebetween to physically contact respective adjacent pairs of elements.

2. The terminal of claim 1 wherein said first group possesses one more element than said second group.

3. The terminal of claim 2 wherein said first group of elements extends inwardly into the receptacle from a first portion of the body means and the second group of elements extends inwardly into the receptacle from a second portion of the body means.

4. The terminal of claim 3 wherein said first and second portions are disposed on opposite positions adjacent said opening.

5. The terminal of claim 4 wherein said elements are adapted to be resiliently deflected inward of said receptacle and away from the opening upon the insertion of electrical leads therein.

6. The terminal of claim 5 wherein the plurality of elements possess an identical tapered configuration to create a varying space between adjacent elements.

7. The terminal of claim 6 wherein one of the elements of either the first group or the second group resiliently biases an electrical lead into the space between adjacent elements of the opposite group for retention of respective electrical leads.

8. The wire retention terminal of claim 1 wherein said body means includes a solder inlet opening.

9. The wire retention terminal of claim 8 wherein said body means includes an inwardly extending tab positioned above the solder inlet opening.

* * * * *